(12) United States Patent
Knyrim (10) Patent No.: US 10,307,329 B2
(45) Date of Patent: *Jun. 4, 2019

(54) CONTROL ARRANGEMENT FOR CONTROLLING THE INTENSITY OF THE MASSAGING MOTION OF A MASSAGE DEVICE AND A MASSAGE DEVICE COMPRISING A CONTROL ARRANGEMENT OF THIS TYPE

(71) Applicant: Jörg Knyrim, Karlsruhe (DE)

(72) Inventor: Jörg Knyrim, Karlsruhe (DE)

( * ) Notice: Subject to any disclaimer, the term of this patent is extended or adjusted under 35 U.S.C. 154(b) by 1002 days.

This patent is subject to a terminal disclaimer.

(21) Appl. No.: 14/432,791

(22) PCT Filed: Oct. 2, 2013

(86) PCT No.: PCT/DE2013/100348
§ 371 (c)(1),
(2) Date: Apr. 1, 2015

(87) PCT Pub. No.: WO2014/053122
PCT Pub. Date: Apr. 10, 2014

(65) Prior Publication Data
US 2015/0272817 A1   Oct. 1, 2015

(30) Foreign Application Priority Data
Oct. 2, 2012   (DE) .................. 10 2012 109 371

(51) Int. Cl.
*A61H 23/00*   (2006.01)
*A61H 23/02*   (2006.01)
(Continued)

(52) U.S. Cl.
CPC ............. *A61H 23/02* (2013.01); *A61H 19/30* (2013.01); *A61H 19/32* (2013.01); *A61H 19/34* (2013.01);
(Continued)

(58) Field of Classification Search
CPC .......... A61H 23/00; A61H 19/00; A61H 21/00
See application file for complete search history.

(56) References Cited

U.S. PATENT DOCUMENTS 6,039,702 A * 3/2000 Cutler ................ A61H 23/0263
601/15
6,375,630 B1 * 4/2002 Cutler ................ A61H 23/0263
601/57
(Continued)

FOREIGN PATENT DOCUMENTS

| DE | 4426446 | 2/1995 |
| DE | 20005475 | 5/2000 |
| EP | 2364687 | 9/2011 |

*Primary Examiner* — Michael J Tsai
*Assistant Examiner* — Christopher E Miller
(74) *Attorney, Agent, or Firm* — Welsh, Flaxman & Gitler, LLC (57) ABSTRACT

The invention relates to a method for controlling the intensity of the massaging motion of a massage device including at least one preferably elongated massage section with at least one wall that forms the outer surface of the massage section and having at least one electric drive device. The drive device has an electric motor unit, at least some sections of which are operatively connected either directly or indirectly to the wall in order to generate a massaging motion. A control assembly, which is connected to the electric motor unit, is provided to control the intensity of the massaging motion. The current electric power draw of the at least one electric motor unit is advantageously determined periodically or continuously, the electric power draw that has been determined is compared to at least one predefined reference power value and the intensity of the massaging motion is controlled depending on the result of said comparison.

16 Claims, 6 Drawing Sheets

(51) Int. Cl.
    *A61H 19/00*     (2006.01)
    *G05B 15/02*     (2006.01)

(52) U.S. Cl.
    CPC .............. *A61H 19/40* (2013.01); *A61H 19/44* (2013.01); *A61H 23/0263* (2013.01); *G05B 15/02* (2013.01); *A61H 2201/50* (2013.01); *A61H 2201/5058* (2013.01); *A61H 2205/087* (2013.01)

(56) References Cited

U.S. PATENT DOCUMENTS

| | | | | |
|---|---|---|---|---|
| 8,308,667 | B2* | 11/2012 | Lee | A61H 19/44 601/46 |
| 8,628,466 | B2* | 1/2014 | Orten | A61F 5/41 600/38 |
| 9,717,646 | B2* | 8/2017 | Knyrim | A61H 23/0263 |
| 2003/0083599 | A1* | 5/2003 | Kitov | A61H 23/0236 601/84 |
| 2006/0235465 | A1* | 10/2006 | Koo | A43B 1/0054 606/204 |
| 2008/0242957 | A1* | 10/2008 | Gaspard | A61B 5/11 600/301 |
| 2009/0171418 | A1* | 7/2009 | Sarif | A61H 39/002 607/59 |
| 2009/0306467 | A1* | 12/2009 | Sonksen | A61H 23/02 600/38 |
| 2010/0318007 | A1* | 12/2010 | O'Brien | A61F 5/56 601/48 |
| 2011/0098613 | A1* | 4/2011 | Thomas | A61C 17/221 601/46 |
| 2012/0136289 | A1* | 5/2012 | McGann | A61H 23/0263 601/78 |
| 2013/0110007 | A1* | 5/2013 | Jeon | A61B 5/1072 600/594 |
| 2013/0165747 | A1* | 6/2013 | Maggs | A61B 5/02438 600/38 |
| 2014/0046127 | A1* | 2/2014 | Topolovac | A61H 19/44 600/38 |

* cited by examiner

CONTROL ARRANGEMENT FOR CONTROLLING THE INTENSITY OF THE MASSAGING MOTION OF A MASSAGE DEVICE AND A MASSAGE DEVICE COMPRISING A CONTROL ARRANGEMENT OF THIS TYPE

BACKGROUND OF THE INVENTION

1. Field of the Invention

The invention relates to a method and massage device for controlling the intensity of the massaging motion of a massage device having at least one elongated massage section, the massage section having at least one wall forming the outer surface of the massage section, and at least one first electrical driving device, wherein the at least one first driving device includes an electric motor unit. The electric motor has at least sections of which are in direct or indirect operative connection with the wall for the purpose of generating a massaging motion, wherein a control arrangement connected to the electric motor unit is provided for controlling the intensity of the massaging motion.

2. Description of the Related Art

Massage devices for sexual stimulation of a female or male sex organ or for training of the pelvic floor are sufficiently known from the prior art. In particular, massage devices that are designed to resemble a male organ and to be introduced into body cavities are known. These devices preferably have the shape of a rod and have a head portion having at least one massaging section in which a massaging motion is generated for the purpose of sexual stimulation of the female sex organ. Such massage devices further include at least one electrically operated drive unit for generating the massage motion in the massaging section of the head portion.

Massage devices for sexual stimulation of the male sex organ, particularly a male penis, are also known. The purpose of such massage devices is to exert corresponding vibrations on the male organ, thereby bringing the organ to an excited state. Such massage devices preferably form an accommodation space that resembles a body cavity, the enclosing wall of which applies massaging movements to the male organ that is inserted in the accommodation space.

The massage devices often include electrically operated drive units, preferably electric motor units, which are supplied with electrical power via an energy supply unit, particularly a battery or rechargeable battery unit, provided inside the massage device. It is known that the electrical output of such a motor unit is dependent on the supply voltage and the current drain, and when a mechanical load is applied to the electric motor unit, if the supply voltage remains constant, the current drain rises, which in turn also increases the power draw. When electrical energy is converted into mechanical energy, conversion losses occur, particularly due to friction losses during this process, so that the mechanical output of an electric motor unit is always less than the electrical power supplied, the mechanical energy being determined by torque and rotating speed. The mechanical forces acting on the drive shaft of the electric motor unit during the massage process lead to an increase in electrical power draw and an increase in the current drain of the electric motor unit, with the result that, with a supply voltage that normally remains constant, the mechanical output generated diminishes, which causes the massaging motion to lose intensity, with unfavourable effect.

From European Patent Application No. EP 2 364 687 A1, a massage device for sexual stimulation of the female sex organs is known, for example, including a main vibrator unit and an auxiliary vibrator unit, in which the intensity of at least one of the vibrator units is adjusted according to the depth to which the massage device penetrates the human body cavity. For this purpose, a plurality of sensor elements are arranged at a distance from each other along the longitudinal axis of the rod-shaped massage device, and transmit a sensor signal when contact is detected between the wall of the massage head portion of the massage device and the surrounding body cavity. The output of one of the vibrator units equipped with an electric motor unit is controlled according to the number of sensor signals detected, that is to say the penetration depth of the massage device into the body cavity.

Based on this, it is an object of the invention to provide a method for controlling the intensity of the massaging motion of a massage device that eliminates the disadvantages of the prior art, and in particular to enable the massaging motion intensity to be controlled as a function of the mechanical force generated during the massage activity and exerted directly or indirectly on the drive shaft of the electric motor unit.

SUMMARY OF THE INVENTION

An essential aspect of the method according to the invention may be considered as being that of periodically or continuously determining the current electrical power draw of the at least one electric motor unit, comparing the electrical power draw determined with at least one predefined reference power draw, and controlling the intensity of the massaging motion on the basis of such comparison. With the inventive method, the intensity of the massaging motion is controlled particularly advantageously for a load applied to the electric motor unit of the massage device by the user exerting pressure on the massage device, specifically on the wall thereof—either by increasing the contact pressure and/or increasing the penetration depth. The user may thus particularly advantageously adapt the intensity of the massage device, or the massaging motion generated thereby, to the user's individual massaging needs and thus also influence the sexual stimulation of the sex organs in accordance with his/her personal requirements.

In a particularly advantageous variant, the change in the electrical power draw induced in the electric motor unit by the effect of the direct or indirect application of force during massaging activity is evaluated in order to define the change in intensity of the massaging motion.

Also advantageously, the amplitude of a supply voltage of the electric motor unit generated by DC voltage is increased or decreased as an operating parameter. Alternatively to this, the "On" to "Off" ratio of a pulse-width-modulated supply voltage of the electric motor unit is altered as an operating parameter.

Also advantageously, at least one operating parameter of the at least one electric motor unit is adjusted to control the intensity of the massaging motion depending on the result of comparing the determined electrical power draw with the at least one predefined reference power draw. Preferably, the supply voltage of the electric motor unit is increased or reduced as the operating parameter.

In an advantageous embodiment, the intensity of motion and/or deformation and/or vibration of the wall that is in direct or indirect operative connection with the electric motor unit is controlled as the massaging motion.

The actual electrical current drain of the electric motor unit is advantageously calculated to determine the current electrical power draw. Alternatively, the effective internal resistance of the electric motor unit may be calculated and evaluated to determine the current electrical power draw at the time. To determine the actual electrical power draw, the number of revolutions of the electric motor unit may also be determined. The number of revolutions of the electric motor unit is preferably determined via an RPM sensor unit operatively connected to the electric motor unit.

In order to determine the actual electrical power draw when the electric motor unit is powered by means of a pulse-width-modulated supply voltage, the counter-voltage generated by the electric motor unit may also be determined in the "Off" times and evaluated to determine the number of revolutions.

Additionally, the electric motor unit may be operated in one of at least two operating modes associated with the determined electrical power draw depending on the comparison result, wherein at least one reference power draw is associated with the operating mode and adapted thereto.

If the energy supply to the massage device is in the form of a battery unit or rechargeable battery unit, the voltage drop or the voltage currently supplied by the battery unit or rechargeable battery unit may also advantageously be evaluated to determine the current electrical power draw of the electric motor unit.

A further object of the invention is a control arrangement designed to perform the method according to the invention, and a massage device including such a control arrangement.

The control arrangement advantageously includes an amplifier circuit for controlling the intensity of the massage motion of the massage device.

Also advantageously, the control arrangement may include at least one wireless data interface, for example a radio transmission interface for exchanging operating data and assuring the control on the basis of such data of the massage motion intensity of a further massaging device.

In one embodiment, the control arrangement includes a micro-controller unit for running a control routine for controlling the massage motion intensity of a massaging device.

For the purpose of the present invention, the expressions "approximately", "substantially" or "about" signify deviations from the respective exact value by +/−10%, preferably by +/−5%, and/or deviations in the form of modifications that have no effect on the function.

In addition, refinements, advantages and application capabilities of the innovation will also become evident from the following description of exemplary embodiments and the figures. All of the features described and/or illustrated, either alone or in any combination, are fundamental constituents of the object of the invention, regardless of their summary representation in the claims or reference thereof.

DETAILED DESCRIPTION OF THE INVENTION

Figure 1:
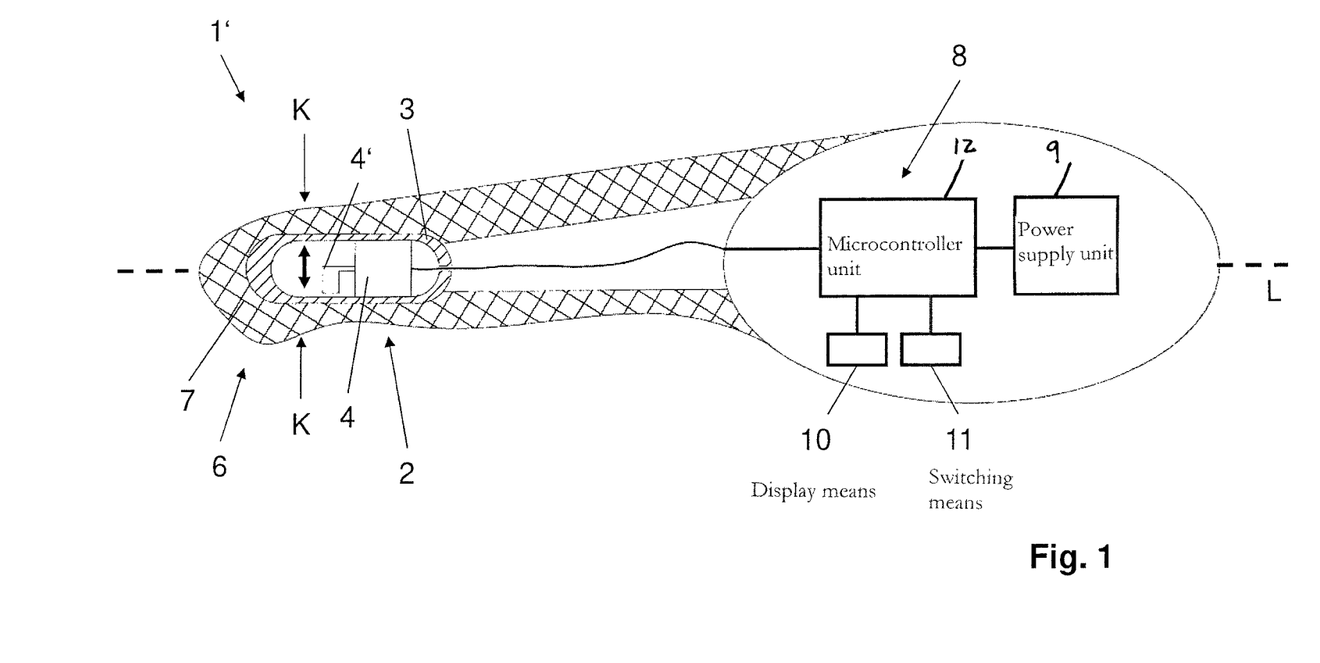
FIG. 1 shows a schematic lengthwise cross section through an exemplary, massage device in the form of a lay-on vibrator, with a control arrangement according to the invention.

FIGS. 1-4 illustrate various embodiments of a massage device 1. Accordingly, FIG. 1 shows a massage device 1 designed as a lay-on vibrator. In order to generate a massaging motion, particularly a vibratory motion in the area of free end 1' of massage device 1, a vibrator unit 2 is provided that includes an electric motor unit 4 with unbalance element 4', for example, accommodated in a housing 3. Of course, the invention is in no way limited to this embodiment of the vibrator unit 2 as shown, and on the contrary various other forms of such a vibrator unit 2 with electric motor unit 4 may equally well be used.

Figure 2:
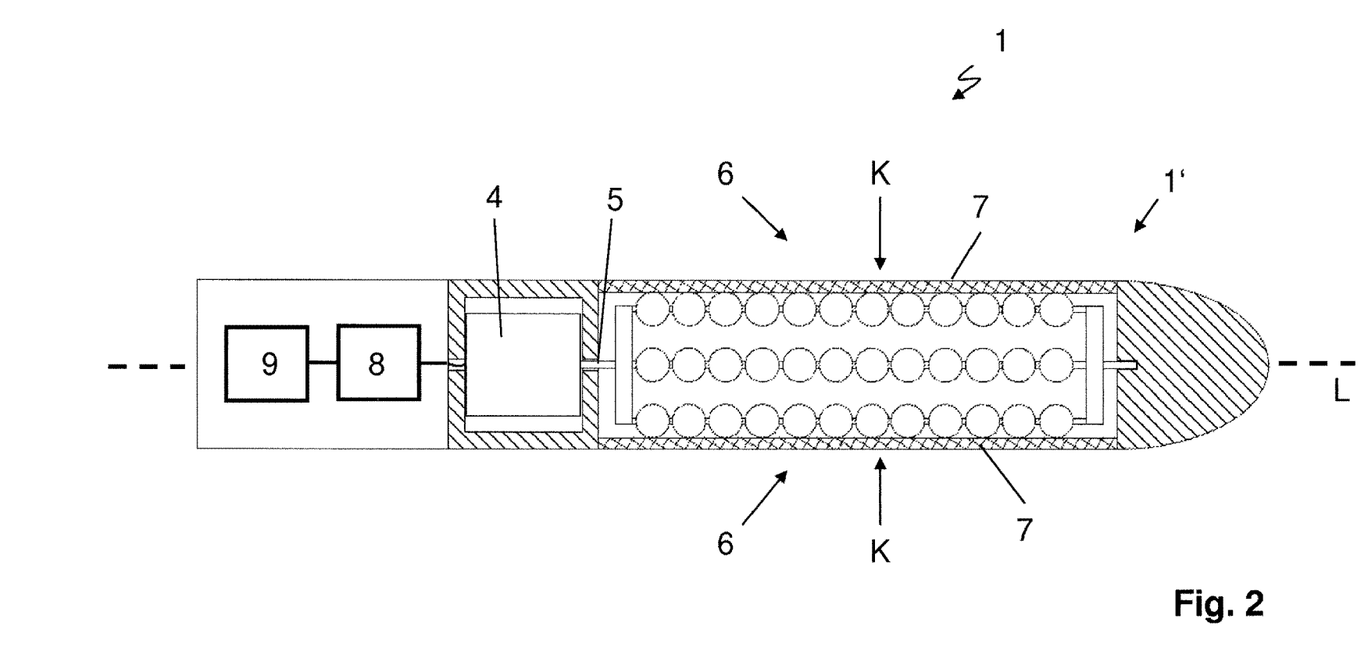
FIG. 2 shows a schematic lengthwise cross section through an exemplary, rod-like massaging device for stimulating the female sex organs, with a control arrangement according to the invention.

FIG. 2 shows an exemplary rod-shaped massage device 1 having a plurality of ball elements rotating about longitudinal axis L of the massage device 1, wherein the ball elements are arranged in rows along a plurality of retaining rod elements extending along longitudinal axis L. The retaining rod elements are aligned concentrically with longitudinal axis L. The driving device described in the preceding is driven by an electric motor unit 4 about an axis of rotation extending coaxially with longitudinal axis L. The rotation of the ball elements about the axis of rotation and longitudinal axis L initiates a massaging motion.

Figure 3:
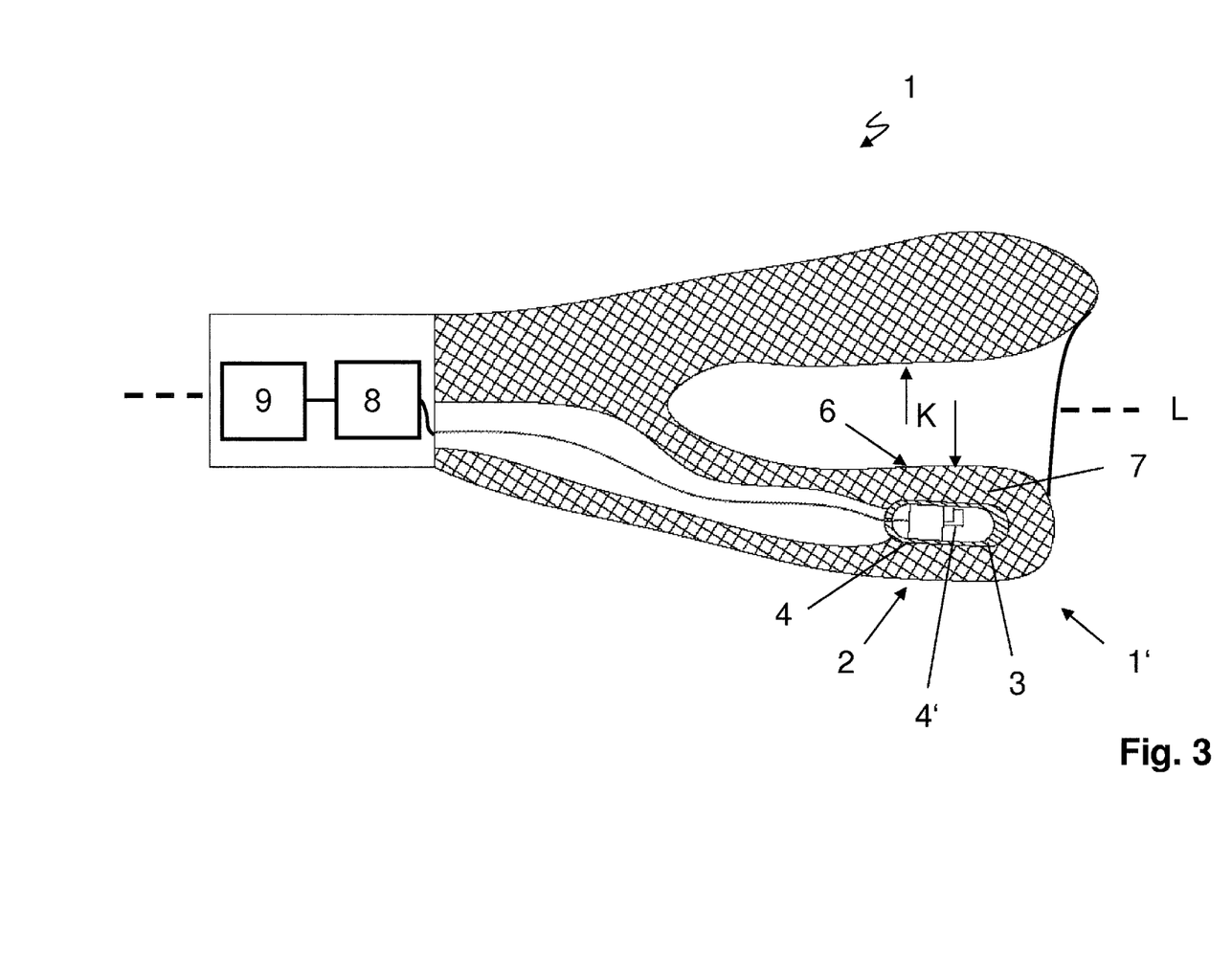
FIG. 3 shows a schematic lengthwise cross section through an exemplary massaging device having a hollowed recess resembling a body cavity for stimulating the male sex organ, with a control arrangement according to the invention.

FIG. 3 shows an example of a massage device 1 designed for the stimulation of the male sex organ, with vibrator unit 2 for generating a massaging motion, which again includes an electric motor unit 4 having an unbalance element 4' and again being accommodated in a housing 3.

Figure 4:
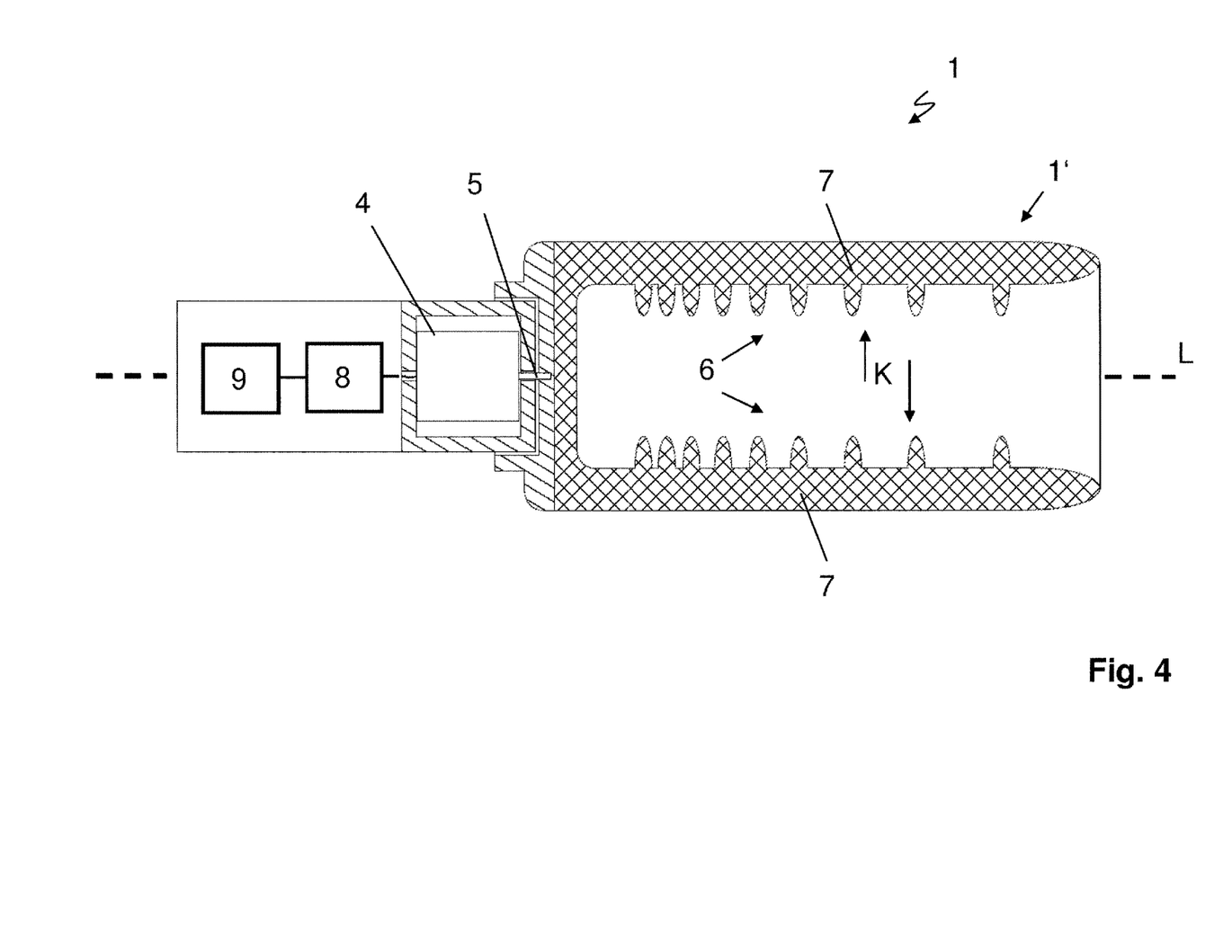
FIG. 4 shows a schematic lengthwise cross section through an exemplary variant of a massaging device having a hollowed recess resembling a body cavity for stimulating the male sex organ, with a control arrangement according to the invention.

Finally, FIG. 4 shows an alternative embodiment of a massage device 1 designed for the stimulation of the male sex organ, having an electric motor unit 4 with a drive shaft 5, which has an accommodation space resembling a body cavity that rotates about the longitudinal axis L of massage device 1.

Depending on the respective embodiment of massage device 1, the drive unit is realised either as an electric motor unit 4 with unbalance element 4' and accommodated in housing 3, designed to generate a vibratory motion of housing 3, or as an electric motor unit 4 with a drive shaft 5 for driving a massaging mechanism about the longitudinal axis L of massage device 1 to initiate a rotating movement about the longitudinal axis L of massage device 1.

Thus, the common feature of the variants in FIGS. 1 to 4 is that at least an electric motor unit 4 for generating a rotating motion of an unbalance element 4' or a drive shaft 5 is provided. The rotating motion of unbalance element 4' or drive shaft 5 is converted either directly or indirectly into a massaging motion, in particular also a vibrating motion of massage device 1. For this purpose, the respective massage device 1 includes at least one preferably elongated massage section 6 that comprises at least one wall 7 forming the outer surface of massage section 6. Wall 7 is made for example from an elastic or semi-elastic material, for example a plastic or foam material.

In order to generate the massaging motion, wall 7 is in direct or indirect operative connection with vibrator unit 2, or with housing 3, of vibrator unit 2, or with electric motor unit 4. In each case, the electric motor unit 4 is connected to a control arrangement 8 via electrical wires, which control arrangement is in turn constructed to have a power supply unit 9 for providing a supply voltage U that is intended to power electric motor unit 4, and which is preferably controlled via control arrangement 8.

As shown in FIG. 1, display means 10 and/or switching means 11 might also be connected to control arrangement 8. The display means 10 may be designed for example as a display unit and/or lighting means such as light emitting diodes and/or speakers, which indicate the current operating state of massage device 1 and/or visually and/or audibly indicate the intensity of the massaging motion currently being output. The drive unit itself may be switched on and off, and optionally various massage intensities and/or a range of massage programs made available by control arrangement 8 may be selected via switching means 11.

Figure 5:
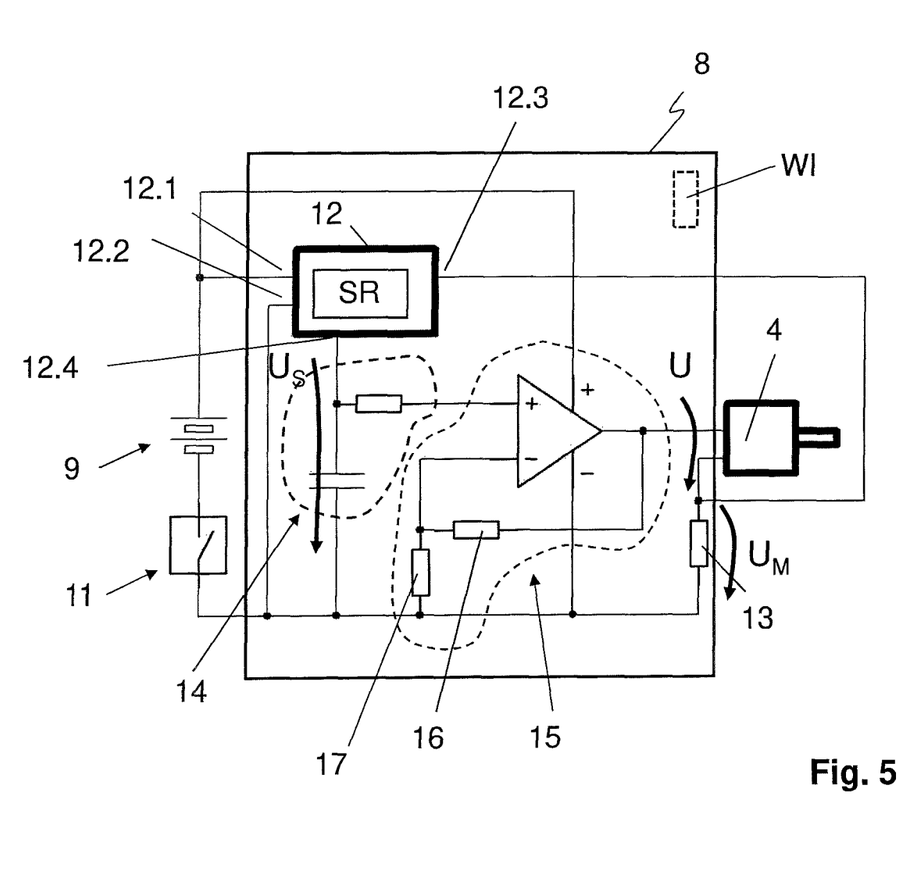
FIG. 5 shows a schematic circuit diagram of an exemplary embodiment of the control arrangement.

Depending on the complexity of the control and/or regulating tasks, control arrangement 2 consists of an electronic circuit comprising a plurality of electronic components such as at least one amplifier circuit 15 with appropriate wiring. Optionally, a microcontroller unit 12 may be provided with an associated, particularly integrated memory unit. FIG. 5 shows an example of a circuit diagram of one variant of control arrangement 2.

In the method according to the invention for controlling the intensity of the massaging motion of a massage device 1 comprising at least one elongated massage section 6 with at least one wall 7 that forms the outer surface of massage section 6 and at least one electrical driving device having an electric motor unit 4, the current electrical power draw of the at least one electric motor unit 4 is determined periodically or continuously by means of control arrangement 8. The determined current electrical power draw is then compared with at least one predefined reference power draw, and the intensity of the massaging motion is controlled on the basis of the result of the comparison. The change in the electrical power draw caused by the direct or indirect application of mechanical force K on electric motor unit 4 during the massaging activity, is preferably evaluated in order to determine the change in intensity of the massaging motion. The application of mechanical force K created by the user during the massaging action is indicated for exemplary purposes by arrows in the figures. Depending on its amplitude, this causes a change in the load on electric motor unit 4, which in turn causes a change in the electrical power draw, which is evaluated for the purpose of controlling the intensity of the massaging motion according to the invention.

Particularly preferably, in order to control the intensity of the massaging motion of massage device 1, at least one operating parameter of the at least one electric motor unit 4, namely the supply voltage U for operating the electric motor unit 4, is changed. For example, by increasing supply voltage U to the electric motor unit 4, the intensity of the massaging motion of massage device 1 may be increased and adapted to current massaging needs. In the same way, lowering the supply voltage U causes the massaging motion to be executed with less intensity. This results in significantly improved sexual stimulation of the respective sexual organ, particularly providing sexual stimulation of the respective sex organ adapted specifically to the massaging needs of the user at the time.

The inventive control of the intensity of massaging motion of a massage device 1 is based principally on the change in the power balance of electric motor unit 4, which may be described with formulas as follows:

$$U \times I = I \times I \times R + c \times I \times 2 \times r \times n \text{ or}$$

$$U = I \times R + c \times 2 \times r \times n \text{ where}$$

U=supply voltage in V (volts)
I=current drain in A (amperes)
R=ohmic resistance of the armature winding in Ohms
c=machine constant in Vs
n=number of revolutions per second in 1/s In this context, product U×I describes the electrical power draw of electric motor unit 4 and the product, wherein product I×I×R yields the electric power loss of motor unit 4 and product c×I×2×π×n indicates the mechanical output provided, which itself is composed of various mechanical power losses such as friction, air resistance, etc., and of the actual mechanical power output that can be tapped. Machine constant c is a machine-specific parameter for each electric motor unit 4.

In particular, supply voltage U consists of the counter-voltage Ui induced in electric motor unit 4 and the effective voltage Uw combined, wherein the effective voltage Uw corresponds to the product I×R. The induced counter-voltage Ui may thus be described with the following formula:

$$Ui = U - Uw = U - I \times R = c \times 2 \times \pi \times n$$

Accordingly, the induced counter-voltage Ui is proportional to the number of revolutions n of electric motor unit 4.

Thus, if resistance R of the armature winding is known, the induced counter-voltage Ui, which is directly proportional to number of revolutions n, can be determined from the current drain I and the predefined supply voltage U.

Thus for example the number of revolutions of electric motor unit 4 may be determined and evaluated in order to determine the current electric power draw, preferably by means of an RPM sensor unit that is operatively connected to electric motor unit 4, not shown in the figures, or if electric motor unit 4 is powered by means of a pulse-width modulated supply voltage U by identifying and evaluating a counter-voltage generated by electric motor unit 4 in the off-times.

For the purposes of the present invention, depending on the embodiment variant of the massaging arrangement 1, the term massaging motion of massage device 1 is understood to be the motion and/or deformation and/or vibration of wall 7 that is directly or indirectly operatively connected to the electric motor unit 4, which is controlled by the method according to the invention. In such a case, starting from a base intensity, the intensity of the massaging motion of the massage device 1 being used is raised or lowered, either incrementally or continuously, corresponding to the current massaging behaviour of the user. If the mechanical force application K created by the user is reduced correspondingly, the intensity of the massage motion may for example be reduced again by the inventive control arrangement 8.

In order to control the massage devices 1 shown in FIGS. 1 to 4, each having a drive device including an electric motor unit 4, control arrangement 2 is designed in such a manner that, as reflected in the circuit diagram illustrated in FIG. 5, at least one microcontroller unit 12 is provided, preferably with an integrated memory unit. A control routine SR is run in microcontroller unit 12, which routine is configured to control the intensity of the massaging motion of massage device 1. For the operation of microcontroller unit 12, the voltage inputs 12.1, 12.2 thereof are connected to energy supply unit 9 via switching means 11. Microcontroller unit 12 is also equipped with a measurement input 12.3 and a control output 12.4.

The actual current drain of electric motor unit 4 is measured by means of a measuring resistor 13 connected upstream of the electric motor unit 4 in terms of the voltage drop $U_M$ across measuring resistor 13 and retained at measurement input 12.3 of microcontroller unit 12. Optionally, additional amplification of measurement voltage $U_M$ may be provided by an operations amplifier unit. Measurement voltage $U_M$ is directly proportional to the electrical power absorbed by electric motor unit 4.

The control voltage $U_S$ output at control output 12.4 is controlled as a function of the measurement voltage $U_M$ incident at microcontroller unit 12. In the present embodiment, control voltage $U_S$ is emitted by microcontroller unit 12 in the form of a pulse width modulated voltage signal, which is converted into a DC voltage via a low pass circuit 14. In this context, low-pass circuit 14 comprises a circuit configuration that is known per se, consisting of a resistor and an associated capacitor.

Alternatively, a control voltage Us may be generated in the form of a DC voltage by microcontroller unit 12 directly at the control output 12.4. Control voltage $U_S$ is incident at the input of an amplifier circuit 15, via which the control voltage $U_S$ generated is amplified in a predefined ratio and forms the supply voltage U for electric motor unit 4. In the present embodiment, amplifier circuit 15 comprises an operations amplifier and at least a first and a second resistor 16, 17. In the present embodiment, the gain of amplifier circuit 15 is set by appropriate dimensioning of the first and second resistors 16, 17 to the circuitry of operations amplifier. The present embodiment variant shows a "non-inverting" amplifier circuit 15 for exemplary purposes.

In an alternative variant, not shown in the figures, the pulse width modulated control voltage $U_S$ output by microcontroller unit 12 output at control output 12.4 may be converted into the supply voltage U via a suitable transistor circuit. In this case, a predetermined value for supply voltage U is assigned to a predefined operating mode BM1, BM2, for example. Alternatively, a predetermined value for supply voltage U can also be assigned to a predefined on-to-off ratio of the pulse width modulated control voltage $U_S$.

Figure 6:
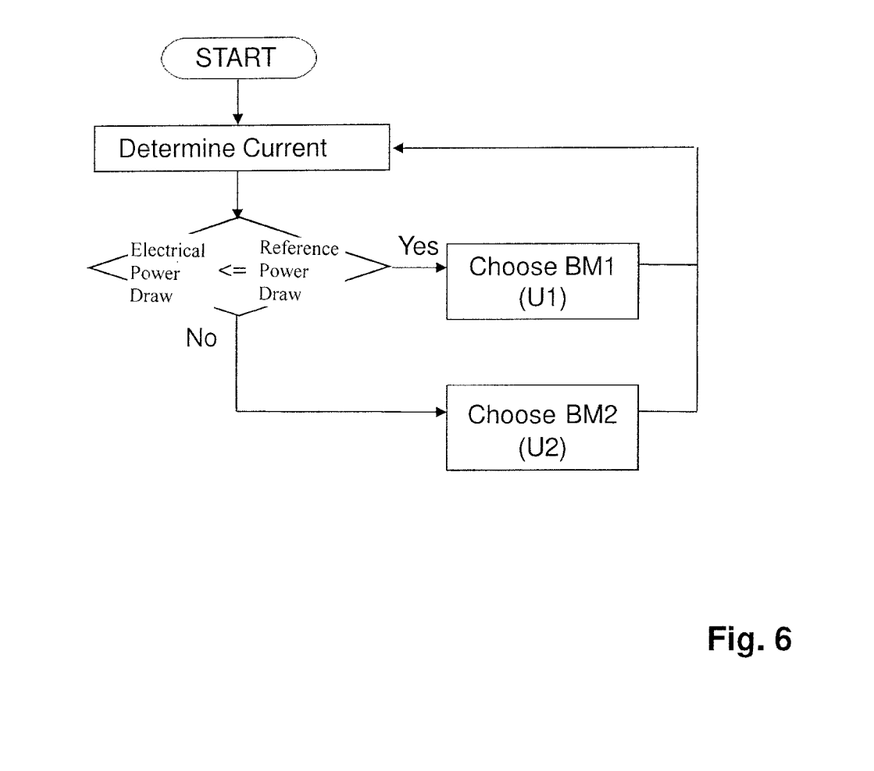
FIG. 6 shows a schematic flowchart of an exemplary control routine.

FIG. 6 shows an example of a simplified flowchart of one possible realization of control routine SR for controlling the intensity of the massaging motion of massage device 1. After massaging apparatus 1 is switched on, first the control routine SR is started and then electric motor unit 4 is placed in a predetermined start-up state. To this end, at least one predetermined reference power value is loaded from the memory unit by the control routine SR. Following this, the current electrical power draw of electric motor unit 4 is determined periodically or continuously. The electrical power draw is determined for example with reference to the current drain of electric motor unit 4. Then, the determined electrical power draw of electric motor unit 4 is compared with the reference power value. If the determined electrical power draw falls below or is equal to the predefined reference power value, electric motor unit 4 is operated in a first operating mode, BM1 with a predefined first operating voltage U1. If the determined electrical power draw exceeds the predefined reference power value, electric motor unit 4 is operated in a second operating mode, BM2 with a predefined second operating voltage U2, wherein the second operating voltage U2 is greater than the first operating voltage U1. In addition, a further reference power value not shown in FIG. 6 may be provided, with which the motor unit can be switched back from the second operating mode BM2 to the first operating mode BM1. It is also possible to provide more than two operating modes BM1, BM2, wherein at least two different reference power values are assigned to each operating mode BM1, BM2 and the individual operating modes BM1, BM2 may be switched according to said assignment. For example, with three different operating modes, in the first mode BM1 a low massage intensity may be provided by the massage device 1, in the second mode BM2 a medium massage intensity, and in the third mode a high massage intensity. The limit values for switching between the respective operating modes BM1, BM2, may be fixed by reference power value assigned individually to each of the different operating modes BM1, BM2. Thus, each operating mode BM1, BM2 has an individually assigned set of regulating parameters.

The intensity of the massaging motion is controlled with a corresponding increase or decrease in supply voltage U as a function of the actual electrical power draw. According to the invention, other operating modes may also be provided in the control routine SR. The predefined operating modes BM1, BM2 preferably provide the predetermined initial operating parameters that are necessary for the running of electric motor unit 4, particularly supply voltages U, U1, U2. Of course, any number of such modes BM1, BM2 may already be stored or individually programmed by the user himself/herself.

Of course, various massage patterns and/or prescribed massage programs may also be included in such operating modes BM1, BM2, and may be stored in the memory unit so that they are selectable by a command from the user and/or the electrical power draw that is present at any given time. For example, if a predetermined power value is exceeded for a predetermined time a vibration program specially tuned for this situation and/or a special sequence of motion patterns may be generated by massage device 1. The maximum values reached during use may also be stored, for example, in order to document the massage or exercise success. These may be displayed to the user via display unit 10. User-specific massage patterns and/or massage programs may also be created by the user, and they may then be saved in the memory unit of microcontroller unit 12 or on another storage medium.

In a further variant of the invention, the intensity of the massaging motion of a second electric motor unit, not shown in the figures, may be regulated as a function of the electric power draw of a first electric motor unit 4, particularly by altering the operating parameters of second electric motor unit 4.

Also, in order to calculate the electrical power draw, the effective internal resistance of electric motor unit 4 may be determined, or if the electric motor unit 4 is actuated by means of a pulse-width modulated voltage signal, the voltage that is induced by the electric motor unit 4 in the times when no voltage amplitude is present may be calculated, and the electrical power draw of the electric motor unit 4 may be determined by evaluation thereof or by evaluation of the speed of electric motor unit 4.

In an alternative variant, the massage device may be equipped with at least one additional electric motor unit (not shown in the figures), which is controlled according to the operating state of the first electric motor unit 4, and in particular is dependent on the current power draw thereof. In this case, in order to control the intensity of the massaging motion of massage device 1, either only one electric motor unit in each case or several electric motor units may be controlled by the method according to the invention, that is to say, depending on the power draw of one electric motor unit 4, the operating parameters of this and/or at least one additional electric motor unit can be adjusted to control the intensity of the massaging motion of massage device 1.

The periodically or continually determined electrical power draw of electric motor unit 4, that is to say the associated measurement values, may be stored in the memory unit. In this way, they may be evaluated again, for example, and/or transmitted via a suitable interface to a personal computer for evaluation.

A massage device 1 shown in FIG. 2, may be used for example for training the pelvic floor of the user, wherein the phrase pelvic floor is understood to mean the base of the pelvic cavity consisting of connective tissue and muscle in humans or animals. In this context, a vibration pattern is generated by wall 7 of massage section 6 of massage device 1, preferably a sequence of short-duration and longer vibration pulses similar to a Morse code. The user must tense his/her pelvic muscles to counteract these vibration pulses, thereby creating a training effect of the pelvic floor musculature.

A remote control unit may also be provided, such a unit being connectable to control arrangement 8 either wirelessly or by wires, and via which control arrangement 8, and consequently massage device 1, may be operated remotely. Data is preferably transmitted via a wireless interface, particularly via WLAN, Bluetooth etc., for example.

Several massage devices 1 may also exchange the respective operating data, via a data interface, and the intensity of the massaging motion of one massage device 1 may be regulated by the operating state of the respective other massaging device using the inventive method.

If energy supply unit 9 has the form of a battery pack or a rechargeable battery pack, the voltage drop or the currently provided voltage thereof may also be evaluated to determine the current power draw of electric motor unit 4.

Of course, the above-mentioned control criteria may be applied in any combination, for example the actual current drain of electric motor unit 4 might be calculated, and/or the effective internal resistance of the first electric motor unit 4 and/or the speed of the of electric motor unit 4 and/or the voltage drop or the voltage currently provided by the battery pack or rechargeable battery pack might be determined and evaluated to determine the current electric power draw.

The invention has been described in the preceding with reference to an exemplary embodiment. Of course, numerous modifications and alterations of this invention are possible without exceeding the scope of the inventive thought.

LIST OF REFERENCE NUMERALS

1 Massage device
1' Free end
2 Vibrator unit
3 Housing
4 Electric motor unit
4' Unbalance element
5 Drive shaft
6 Massage section
7 Wall
8 Control arrangement
9 Power supply unit
10 Display means
11 Switching means
12 Microcontroller unit
12.1, 12.2 Voltage input
12.3 Measurement input
12.4 Control output
13 Measuring resistor
14 Low pass circuit
15 Amplifier circuit
16 First resistor
17 Second resistor
18 Operation amplifier
U Supply voltage
$U_1$ First supply voltage
$U_2$ Second supply voltage
$U_M$ Measurement voltage
$U_S$ Control voltage
L Longitudinal axis
SR Control routine
    Power draw
    Predefined reference power value

The invention claimed is:

1. A method for controlling intensity of a massaging motion of a massage device comprising at least one elongated massage section having at least one wall forming an outer surface of the at least one elongated massage section, and at least one first electrical driving device, wherein the at least one first electrical driving device includes an electric motor unit, at least sections of the electric motor unit are in direct or indirect operative connection with the at least one wall for generating the massaging motion, comprising the steps of:
    controlling intensity of the massaging motion and/or deformation and/or vibration of the at least one wall that is in direct or indirect operative connection with a control arrangement connected to the electric motor unit, and
    periodically or continually determining and comparing a determined current electrical power draw with at least one predefined reference power value, and
    wherein the controlling intensity of the massaging motion is on a basis of a result of the comparison between the determined current electrical power draw and the at least one predefined reference power value, wherein starting from a base intensity, the intensity of the massaging motion is raised or lowered, incrementally or continuously and further comprising the step of evaluating a change in the determined current electrical power draw that is caused by a direct or indirect action on the electric motor unit of a mechanical force generated during the massaging motion by identifying and evaluating a counter-voltage generated by the electric motor unit to set a change in intensity of the massaging motion.

2. The method according to claim 1, wherein at least one operating parameter of the electric motor unit is adjusted to control the intensity of the massaging motion depending on the result of the comparison of the determined current electrical power draw with the at least one predefined reference power value.

3. The method according to claim 2, wherein an amplitude of a supply voltage formed by a DC voltage of the electric motor unit is increased or decreased as an operating parameter.

4. The method according to claim 2, wherein an "On" to "Off" ratio of a pulse-width-modulated supply voltage of the electric motor unit is altered as an operating parameter.

5. The method according to claim 1, wherein an actual electrical current drain of the electric motor unit is calculated to determine the determined current electrical power draw.

6. The method according to claim 1, wherein an effective internal resistance of the electric motor unit is calculated and evaluated to determine the determined current electrical power draw.

7. The method according to claim 1, whereby in order to determine the determined current electrical power draw during usage of the electric motor unit, a number of revolutions of the electric motor unit is determined during the usage of the electric motor unit and evaluated.

8. The method according to claim 7, wherein the number of revolutions of the electrical motor unit during the usage of the electric motor unit is determined via a revolutions per minute sensor unit operatively connected to the electric motor unit.

9. The method according to claim 7, whereby in order to determine the determined current electrical power draw when the electric motor unit is powered by a pulse-width-modulated supply voltage, a counter-voltage generated by the electric motor unit is determined in "Off" times and evaluated to determine the number of revolutions of the electric motor unit during the usage of the electric motor unit.

10. The method according to claim 1, whereby depending on the result of the comparison between the determined current electrical power draw and the at least one predefined reference power value, the electric motor unit is operated in one of at least two operating modes assigned to the determined electrical power draw, wherein the at least one reference power value is associated with one of at least two operating modes.

11. The method according to claim 1, whereby for a power supply of the massage device using a battery unit or a rechargeable battery unit, a voltage drop or a voltage currently supplied by the battery unit or the rechargeable battery unit is evaluated to determine the current electric power draw of the electric motor unit.

12. A control arrangement for controlling intensity of a massaging motion of a massage device the massage device comprising at least one elongated massage section having at least one wall forming an outer surface of the at least one elongated massage section, and at least one first electrical driving device, wherein the at least one first electrical driving device includes an electric motor unit, at least sections of the electric motor unit are in direct or indirect operative connection with the at least one wall for generating a massaging motion, the control arrangement being connected to the electric motor unit for controlling an intensity of the massaging motion, the control arrangement controls intensity of the massaging motion and/or deformation and/or vibration of the at least one wall that is in direct or indirect operative connection with the electric motor unit, and periodically or continually determines and compares a determined current electrical power draw, the determined current electrical power draw is compared with at least one predefined reference power value, wherein starting from a base intensity, the intensity of the massaging motion is raised or lowered, incrementally or continuously and further comprising the step of evaluating a change in the determined current electrical power draw that is caused by a direct or indirect action on the electric motor unit of a mechanical force generated during the massaging motion by identifying and evaluating a counter-voltage generated by the electric motor unit to set a change in intensity of the massaging motion.

13. The control arrangement according to claim 12, wherein the control arrangement has an amplifier circuit for controlling the intensity of the massaging motion of the massage device.

14. The control arrangement according to claim 12, wherein the control arrangement comprises a micro-controller unit for running a control routine for controlling the massage motion intensity of the massage device.

15. The control arrangement according to claim 12, wherein the control arrangement comprises at least one wireless data interface for exchanging operating data and enabling a user of the massage device to control massage motion intensity of the massage device.

16. A massage device comprising at least one elongated massage section having at least one wall forming an outer surface of the at least one elongated massage section, and at least one first electrical driving device, wherein the at least one first electrical driving device includes an electric motor unit, at least sections of the electric motor unit are in direct or indirect operative connection with the at least one wall for generating a massaging motion, wherein a control arrangement connected to the electric motor unit is for controlling an intensity of the massaging motion, the control arrangement controls intensity of the massaging motion and/or deformation and/or vibration of the at least one wall that is in direct or indirect operative connection with a control arrangement connected to the electric motor unit, and periodically or continually determining a determined current electrical power draw, the determined current electrical power draw is compared with at least one predefined reference power value, wherein starting from a base intensity, the intensity of the massaging motion is raised or lowered, incrementally or continuously and further comprising the step of evaluating a change in the determined current electrical power draw that is caused by a direct or indirect action on the electric motor unit of a mechanical force generated during the massaging motion by identifying and evaluating a counter-voltage generated by the electric motor unit to set a change in intensity of the massaging motion.

* * * * *